United States Patent

[11] 3,559,793

| [72] | Inventor | Anthony T. C. Lange |
| | | 3810 N. 169th St., Brookfield, Wis. 53005 |
| [21] | Appl. No. | 766,791 |
| [22] | Filed | Oct. 11, 1968 |
| [45] | Patented | Feb. 2, 1971 |

[54] CONTINUOUS CONVEYOR SYSTEMS
14 Claims, 6 Drawing Figs.

| [52] | U.S. Cl. | 198/19, 198/127, 198/135 |
| [51] | Int. Cl. | B23q 5/22, B65g 13/02 |
| [50] | Field of Search | 198/19, 135, 127; 193/36 |

[56] References Cited
UNITED STATES PATENTS

| 1,549,499 | 8/1925 | Parker | 198/19X |
| 1,650,037 | 11/1927 | Phillips | 198/127 |
| 2,453,401 | 11/1948 | Beeching | 198/127 |
| 3,367,517 | 2/1968 | Dallape | 193/36 |

Primary Examiner—Edward A. Sroka
Attorney—Morsell and Morsell

ABSTRACT: A continuous conveyor apparatus including a plurality of flat work-holding pallets movably supported on rollers projecting above spaced, parallel tracks, there being adjustable pneumatic pistons adapted to rotatably drive spaced drive rollers to engage the underside of said work-holding pallets and convey the same along said line of rollers, said apparatus including work stations adjacent the conveyor line and associated pallet-transferring means permitting the temporary sidetracking of selected pallets, and said apparatus including novel corner-turning means for automatically transferring pallets onto a transverse conveyor line.

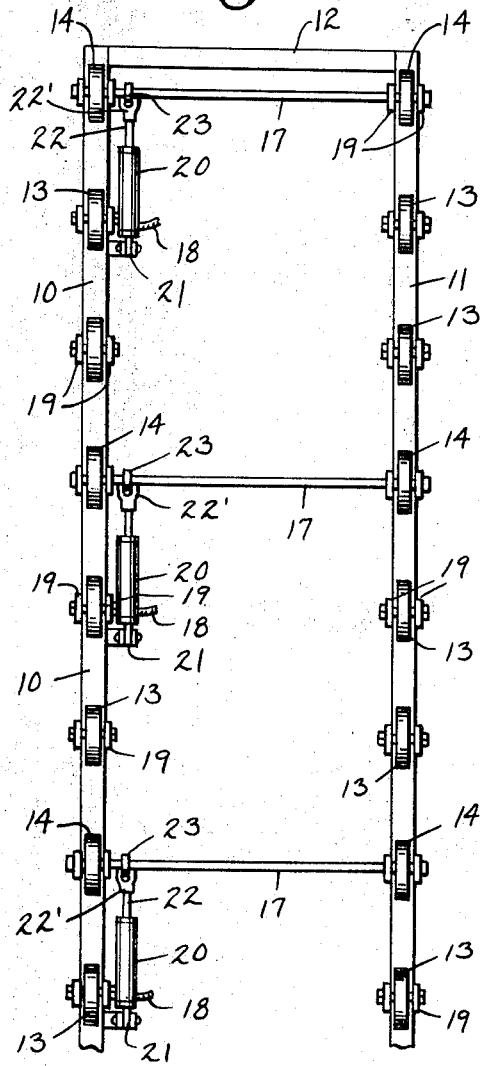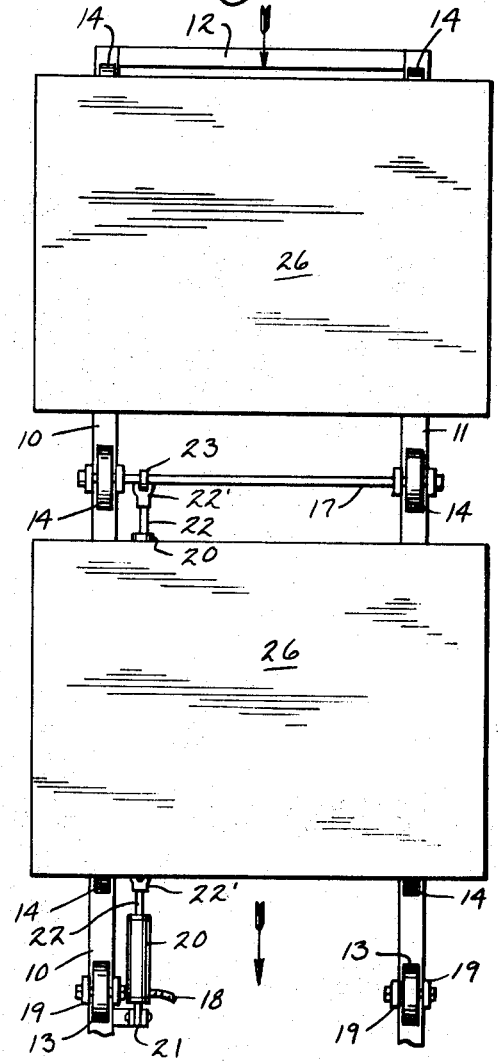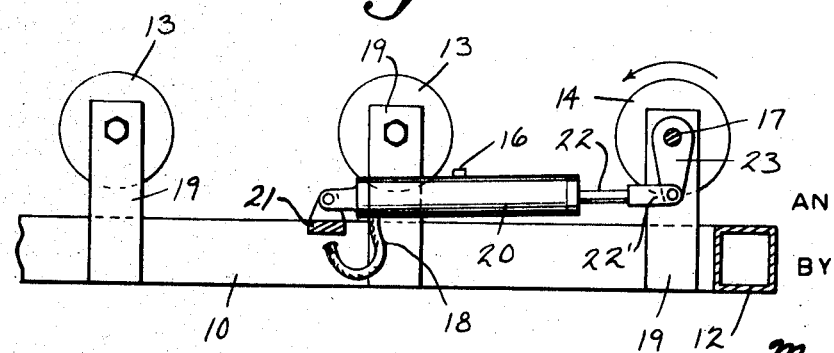
INVENTOR
ANTHONY T. C. LANGE
BY
Morsell & Morsell
ATTORNEYS

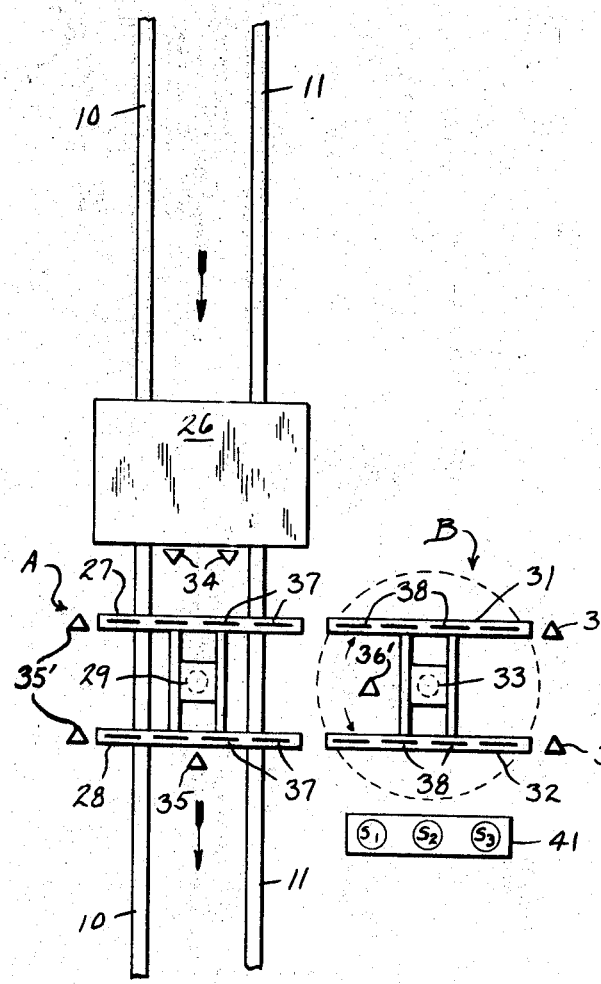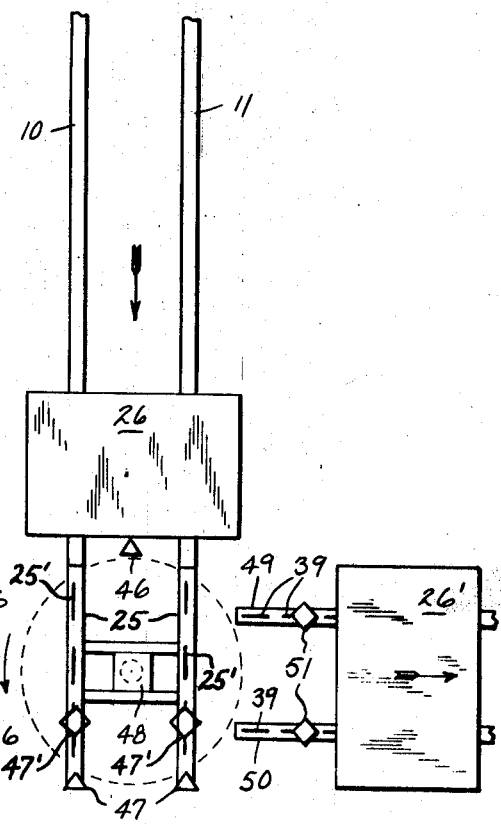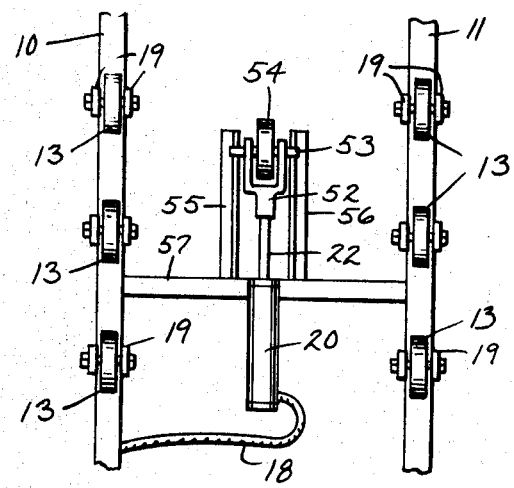

CONTINUOUS CONVEYOR SYSTEMS

BACKGROUND OF THE INVENTION

1. Field of the Invention

The present invention relates to the conveyor art, and more particularly to a pneumatically-driven continuous conveyor for use in assembly line manufacturing operations and the like.

2. Description of the Prior Art

In many manufacturing plants employing assembly line production methods mechanically- or electrically-driven conveyors are utilized to continuously advance the workpieces along said assembly line as workmen perform the various manufacturing operations on said pieces. Unfortunately, such conventional mechanical or electric conveyor systems are relatively expensive both in initial cost and in operation, as well as being dirty, and as well as being dangerous in the event there is water on the building floor or combustible or explosive materials in the immediate vicinity.

SUMMARY OF THE INVENTION

With the above considerations in mind, the objects of the present invention are to provide a novel pneumatically-driven continuous conveyor system which can be manufactured and operated for substantially less cost than conventional mechanical and electric conveyors, which pneumatic conveyor is not as dirty and messy as conventional power-driven conveyors, and which entirely air-driven apparatus eliminates the necessity for electric components and circuitry which can be dangerous in the event of water on the building floor, or in the event the conveyor is in close proximity to explosive or combustible materials.

A further important object of the present invention is to provide a novel conveyor apparatus which is manually operable in the event of a failure in the power drive means, thereby eliminating time-consuming and costly "down time" which sometimes occurs with conventional power-driven conveyors.

A further object is to provide an improved conveyor having stations at spaced intervals where workpieces can be quickly and easily temporarily sidetracked to permit required manufacturing operations thereon, and which conveyor is provided with novel corner-turning means which permit smooth, uninterrupted changes in travel direction.

A further object of the invention is to provide a conveyor apparatus which is readily adjustable to permit its travel speed to be set as desired, depending upon its intended use.

Still further objects of the present invention are to provide a conveyor apparatus which is relatively light in weight and easily transported, which is rugged and durable in construction, and which novel and improved conveyor is otherwise particularly well adapted for its intended purposes.

BRIEF DESCRIPTION OF THE DRAWING

In the accompanying drawings, wherein there is illustrated a preferred embodiment of the invention, as well as a modified form thereof, and wherein the same reference numerals designate the same parts in all of the views:

FIG. 1 is a top plan view of a section of the conveyor track;

FIG. 2 is a top plan view of the conveyor track section shown in FIG. 1 with a pair of load-carrying pallets thereon;

FIG. 3 is a fragmentary side elevational view showing one of the pneumatic drive assemblies;

FIG. 4 is a fragmentary diagrammatic plan view showing one of the work stations incorporated in the conveyor system;

FIG. 5 is a fragmentary diagrammatic plan view of one of the corner assemblies; and FIG. 6 is a fragmentary plan view of a modified form of drive member coming within the scope of the invention.

DESCRIPTION OF THE PREFERRED EMBODIMENTS

Referring now more particularly to FIG. 1 of the drawings, the novel conveyor apparatus comprising the present invention includes a pair of spaced parallel tracks 10 and 11 which are preferably formed of hollow steel tubing which is rectangular in cross section. Ordinarily said tracks are connected by transverse end members 12 and are arranged in sections approximately 20 feet in length. Any number of sections can be coupled in abutting relationship, depending upon the floor design or requirements of the particular manufacturing plant. In this respect, incidentally, it is to be understood that while the present conveyor apparatus is particularly well adapted for use in assembly line operations in manufacturing plants, it might also be advantageously employed for numerous other uses, and the invention is by no means to be limited in this respect.

Mounted on and above the tracks 10 and 11 are spaced pairs of rollers 13, 14 which are provided with tires formed of rubber or other material having good frictional properties. Each of said rollers is supported by bracket arms 19 which are welded on opposite sides of said tracks and which project upwardly thereabove, the rollers 13 being free wheeling and the rollers 14 being power driven, as will be described. In the illustrated form of the invention said rollers are spaced every 12 inches, and every third roller 14 is power driven. However, it is to be understood that this ratio is not critical and the invention can be modified in this respect.

As is shown in FIG. 2, in the use of the present conveyor apparatus a plurality of pallets 26 formed of plywood or other suitable material ride on said rollers 13, 14 and during the operation of the conveyor said pallets are designed to continuously advance along said conveyor line so that workmen may perform assembly operations on the workpieces carried thereon. In the usual manufacturing setup the assembly line is so designed that the products carried by said pallets will be completely assembled at the time they reach the end of said conveyor.

As hereinabove mentioned, in the illustrated embodiment of the present invention every third roller 14 is power driven, said driven rollers being designed to frictionally engage the underside of the pallets 26 and to urge the same forwardly along the conveyor, as will be described. Preferably, only the rollers 14 carried by the track 10 are directly operatively connected to the drive means, and the opposed rollers 14 on the track 11 are keyed to and driven through axle shafts 19 connected thereto.

The novel pneumatic drive assembly characterizing the present invention best appears in FIG. 3 of the drawings and includes an air cylinder 20 pivotally secured to the track member 10 adjacent each of said drive rollers 14 by means of a support bracket 21, each of said cylinders having a rearwardly projecting double acting extensible piston 22. Carried on the outer end of said piston is a clevis 22' and pivotally connected thereto is a crank arm 23 which extends upwardly and is operatively associated with the transverse shaft 17 forming the axle for said driven rollers 14.

Said crank arm 23 is provided with an overriding or one-way clutch of a commercially available type which is adapted to turn the shaft 17 in one direction only. Thus, when the piston 22 is extended it rotates said shaft 17 and roller 14 in the direction indicated by the arrow in FIG. 3, and upon the return stroke of said piston the one-way clutch within the arm 23 prevents said shaft and roller from turning in the opposite direction. As a result, when a pallet 26 (FIG. 2) is positioned on one or more of said pairs of rollers 14 said pallet will be advanced on the conveyor by the frictional engagement of said drive rollers as they are turned through the actuation of said hydraulic cylinder and piston 20–22. As mentioned, said rollers are provided with rubber tires to increase their frictional properties.

In the illustrated form of the present invention the pairs of power-driven rollers 14 are so spaced that there will be at least one pair of said rollers positioned under each pallet 26 on the conveyor line at all times, although the conveyor will perform satisfactorily with fewer rollers. Moreover, while each drive roller 14 on the track 10 in the illustrated conveyor is provided with a pneumatic actuating piston 22, it is also possible to utilize an elongated piston and multiple crank arms to drive a number of rollers off the same cylinder. Ordinarily the pallets 26 will be strung out in abutting or closely adjacent relationship as they travel down the assembly line, but this may be varied as desired.

The air for the pneumatic cylinder and piston assemblies 20-22 is carried within the hollow track 10, said track being sealed and connected to a source of air under pressure, and is directed into each of said pneumatic cylinders 20 by means of a flexible hose 18 (FIG. 3). The double-acting piston 22 is designed to reciprocate when the conveyor is in operation and a valve 16 permits the action of said piston to be adjusted for any desired speed. In this manner the travel rate of the pallets can be set within a wide range of speeds, depending upon the requirements of the particular manufacturing operation. Moreover, the individual adjustability of said drive rollers permits the pallets to be speeded up at desired locations along the assembly line, which is important in the operation of the work stations incorporated in the present invention, as will be hereinafter described.

As mentioned, the track 10 forms the air supply tank for the operation of the pneumatic drive cylinders characterizing the present invention, and in the preferred form of the invention said track 10 is divided into sections of approximately 20 feet which are loosely coupled by short lengths of flexible air hose to permit expansion or contraction of said steel tracks without damage. Ordinarily a quantity of oil is carried within the track 10 to collect sludge, etc. and for this reason the outlet for the flexible hose 18 leading to the pneumatic cylinder 20 is preferably spaced above the bottom of said track so that only air will be drawn into said cylinder regardless of the presence of oil or sludge in the lower portion of the track.

The rollers utilized in the present invention are of relatively large diameter and are free wheeling, as described, and in the event of a failure in the pneumatic drive mechanism the work-holding pallets 26 can be easily manually pushed along the conveyor. This is unlike many conventional mechanical or electric conveyors wherein a malfunction in the automatic drive mechanism results in a complete stoppage of the assembly line, and which "down time" is both inconvenient and costly.

In accordance with the present invention, the conveyor line includes a number of short transverse work stations where the work-holding pallets can be temporarily sidetracked to permit various assembly operations to be performed on the articles carried thereon.

As shown in FIG. 4 of the drawings, each of the work stations incorporated in the present invention includes a section in the main conveyor line which is designated generally in the drawing by the letter A, and which section includes a pair of transverse tracks 27, 28 mounted on a pneumatic lift and frame 29. If it is desired to sidetrack one of the work-holding pallets 26, when said pallet reaches station A a workman or operator can actuate one of the pneumatic pushbutton or pedal valve switches 41 to raise the stop 35, and by means of another switch he can elevate the lift 29 with said pallet thereon. Said lift is provided with free wheeling rollers 37 and when the pallet has been elevated above the level of the main conveyor line the workmen may easily manually shift said pallet onto an adjacent station which is designated B. Station B includes a short section of parallel tracks 31, 32 having free wheeling rollers 38, and said tracks are mounted on a rotatable lift unit 33 having fixed stops 36 and a controllable stop 36' to retain the pallet in proper position thereon, the rotatable nature of said lift permitting the workman to raise the pallet to a convenient height through the actuation of another switch and to turn said pallet as desired while he works on the product carried thereby.

When the workman wishes to transfer the pallet from the work station B back onto the main conveyor line the stops 36' and 35 are released and the pallet is manually urged onto the tracks 27, 28. The lift unit 29 is then lowered until the pallet again rests on the rollers on said main line, there being fixed stops 35' to ensure that said pallet is properly positioned on said main conveyor tracks 10, 11. The drive rollers on said main line then engage the underside of the pallet and it resumes traveling along said main conveyor line. It is to be understood that FIGS. 4 and 5 are simplified diagrammatic views and, accordingly, the rollers 13, 14 on the main conveyor line have not been shown therein.

Any number of work stations similar to that illustrated in FIG. 4 can be provided in the present conveyor system, of course, depending upon the requirements of the particular manufacturing operation, and the invention is not to be limited in this respect. In addition, while the illustrated work station is so designed that the pallets are manually transferred onto said work station from the main conveyor line it is also possible to employ pneumatically-driven rollers on said work station to perform that function.

One of the novel features of the present invention which is incorporated in the above-described work station transfer assemblies is the means for halting the travel of the succeeding pallets while positioning and transferring a pallet onto the work station. In this respect, and referring still to FIG. 3 of the drawing, when a pallet 26 on the main conveyor line approaches station A the drive rollers 14 thereunder are designed to increase the travel speed of said leading pallet. As hereinabove mentioned, a number of pallets are ordinarily strung out in abutting relationship, with no space therebetween, but when said leading pallet is speeded up as it approaches station A it draws away from the slower-moving pallet immediately therebehind, leaving a space or gap between said pallets. Mounted a short distance forwardly of station A are a pair of weighted pivotal stop members 34 which normally engage or drag lightly against the underside of the uninterrupted line of work-holding pallets passing thereover. When the leading pallet is speeded up to provide a gap between said pallet and the one immediately therebehind, however, said pivotal stop members are designed to swing to an upwardly-projecting position wherein they prevent the continued travel of the line of pallets behind said leading pallet. After the workman has completed the required assembly operations on the sidetracked work-holding pallet and said pallet has been returned to the main conveyor line as described, he may release the stops 34 to permit the next pallet to advance to station A, and the entire operation may be repeated.

Another novel feature incorporated in the present invention is the corner-turning assembly which provides for the automatic shifting of the work-holding pallets to a transverse conveyor when they reach the end of a straight conveyor line section, and without requiring a human operator. Referring now to FIG. 5 of the drawings, said corner assembly includes a pneumatically-actuated turntable 48 having parallel tracks 25 and rollers 25', at least one pair of which rollers is driven by a pneumatic cylinder unit similar to that hereinabove described. From said turntable the pallets are shifted onto transverse conveyor tracks 49, 50 which are provided with rollers 39 including drive rollers.

In the operation of said turning mechanism, as a work-holding pallet 26 approaches the end of the straight conveyor section it is intercepted and temporarily halted by a stop 46 to make sure that there are no other pallets on the turntable. This is determined by pneumatic sensing switches 51 and 47' which are designed to relay a signal when a pallet, such as the pallet 26' in FIG. 5, passes thereover, thus indicating that the corner is clear and simultaneously retracting said stop 46 to allow the next pallet to move onto the turntable.

When the pallet 26 reaches the stops 47 it is properly positioned on the turntable 48, and the sensing switches 47' automatically cause said turntable to be rotated 90°, so that the rectangular pallets will assume the same relative position on the transverse tracks 49, 50. As said turntable rotates the stops 47 are automatically released and the turntable drive rollers urge the pallet onto said transverse conveyor tracks, where it continues its travel. As mentioned, as the pallet passes over the valves 51 the stop 46 is automatically released so that the next pallet can be advanced onto the turntable and the operation repeated.

It is to be remembered that all of the valves and switches described in connection with the present invention are pneumatic, and there are no electrical switches or circuits employed. This is one of the principal advantages of the present invention over prior conveyors, since it makes the system entirely safe and permits its use in buildings that are liable to be subjected to water, as well as in installations where the conveyor system is located adjacent explosive or combustible materials. Moreover, of course, the use of air provides a much cleaner and neater apparatus than the mechanical conveyors heretofore employed.

When the work-holding pallets 26 reach the end of the assembly line the manufactured articles carried thereby may be transferred to an elevator or other means for conveying them to the shipping or storage location, and which supplemental conveyors can be incorporated into the present system as an integral part thereof.

In FIG. 6 of the drawings there is shown a modified form of drive mechanism which can be utilized within the scope of the present invention. In this form, in lieu of the pairs of drive rollers 14 which are mounted on the parallel tracks in the conveyor line, a single roller 54 and drive unit is centered between said tracks, there being any desired number of similar drive units spaced along the length of the conveyor. Said drive unit includes a pneumatic cylinder 20 connected to an air supply in the track 10 by a hose 18, and an extensible double-acting piston 22 having a clevis 52 and axle shaft 53 carrying said roller. Said roller shaft 53 is designed to ride on tracks 55, 56, thus permitting the longitudinal movement of said roller 54 with the piston. In the use of this form of the invention, during the extension stroke of said piston 22 the roller 54 is rendered nonrotatable by means of a one-way clutch mechanism in the clevis 52, and as said piston is extended the frictional engagement between the rubber surface of said nonrotatable roller and the underside of a pallet functions to push said pallet forwardly along the conveyor. Upon the return stroke of said piston 22, however, said one-way clutch allows the roller to roll freely on the underside of the pallet, thus preventing said pallet from being drawn rearwardly on said return stroke.

As will be seen from the foregoing detailed description, the present invention provides a novel pneumatically-actuated continuous conveyor apparatus for use in assembly line operations in manufacturing plants, as well as for other uses, which has several important advantages over the mechanical and electrical conveyors heretofore used. Primarily, the present conveyor can be constructed for substantially less cost than said prior units, and it is less expensive to operate. In addition, the present pneumatic conveyor has no electrical components and can be used in or around water or combustible materials without danger.

Further important advantages of the present conveyor are that it can be manually operated in the event of a failure in the automatic drive mechanism, thereby eliminating "down time", it does not require skilled or specially-trained operators, and the travel speed of said conveyor can be readily adjusted and set as desired, depending upon the particular manufacturing operation. Moreover, said conveyor is clean, it is light in weight and easily transported, and it is rugged and durable in construction.

It is to be understood that the present invention is not to be limited or confined to an apparatus identical in all respects to that illustrated and hereinbefore described. It is contemplated, for example, that in some instances it might be preferred to use hydraulic power means in lieu of the pneumatic power described herein. In addition, numerous other changes or possible modifications in the present invention will occur to those skilled in this art, and it is intended to cover herein not only the illustrated embodiment of the invention but also any and all modifications or variations both in the design and intended uses of the device as may come within the spirit of said invention, and within the scope of the following claims.

I claim:

1. A continuous conveyor apparatus, comprising: a pair of spaced parallel tracks; a plurality of pairs of rollers mounted on and above said tracks in spaced relationship; a plurality of work-carrying pallets supported on and between said tracks and adapted to ride on said rollers; a plurality of longitudinally spaced pneumatic cylinder and double-acting piston units mounted adjacent some of said rollers, said cylinders being connected to a source of air under pressure; a crank arm connecting each of said pistons to one of said rollers, said crank arm being designed to rotate said roller in one direction during the extension stroke of said piston to cause a pallet on said roller to advance along said conveyor tracks; and clutch means associated with said crank arm preventing said roller from rotating in the opposite direction during the piston return stroke.

2. The conveyor apparatus recited in claim 1 and wherein said driven rollers are provided with peripheral surfaces having relatively good frictional properties to promote the engagement of said rollers with the undersides of said pallets.

3. The conveyor apparatus recited in claim 1 and wherein said rollers are of relatively large diameter and are free wheeling to permit the easy manual manipulation of said pallets along said conveyor tracks in the event of a malfunction in the pneumatic drive apparatus.

4. The conveyor apparatus recited in claim 1 and wherein one of said tracks is hollow and forms the air supply tank for said pneumatic cylinders, there being flexible air hoses connecting said cylinders to said supply tank.

5. The conveyor apparatus recited in claim 1 and having pneumatic valve means for individually controlling the operating speed of said pistons.

6. The conveyor apparatus recited in claim 1 and having shaft means drivingly connecting each of said driven rollers to the roller opposite it on the other track.

7. A conveyor apparatus as recited in claim 1 and having a work station in and extending laterally from said conveyor tracks, said work station including a pneumatically-actuated lift unit having a pair of tracks arranged transversely to said conveyor tracks, and said lift unit tracks having free wheeling rollers thereon whereby when said lift is elevated above the level of said conveyor tracks a work-holding pallet carried on said lift can be readily shifted laterally off said conveyor line.

8. The conveyor apparatus recited in claim 7 and including a rotatable lift positioned to receive a pallet from said work station unit, the rotatable nature of said lift permitting the adjustable positioning of a pallet thereon.

9. The apparatus recited in claim 8 and having pneumatically-actuated stop means permitting a line of succeeding pallets on the conveyor tracks to be halted while a pallet is transferred to said work station.

10. The apparatus recited in claim 9 including fixed and pneumatically-controllable stop means for positioning a pallet on said work station and lift units.

11. A conveyor apparatus as recited in claim 1 and having means for transferring said pallets to a transverse conveyor line, comprising: a pneumatically-actuated turntable at the end of said conveyor tracks adapted to receive pallets therefrom, said turntable having a pair of tracks thereon alignable with said conveyor tracks and said turntable being rotatable to align said tracks with said transverse conveyor line; and pneumatically-driven means on said turntable adapted to transfer a pallet from said turntable onto said transverse conveyor line when said turntable is rotated to align the tracks thereon with said transverse conveyor line.

12. The apparatus recited in claim 11 and having pneumatically-actuated stop means automatically temporarily halting succeeding pallets on the conveyor tracks while a pallet is being transferred to said transverse conveyor line.

13. The apparatus recited in claim 12 and having pneumatically-actuated means for automatically releasing said stop means when said transfer apparatus is unoccupied to permit another pallet to move onto said turntable.

14. The apparatus recited in claim 13 and including pneumatic means on said turntable for automatically rotating the same when a pallet is in position thereon, and for rotating said turntable back to its pallet-receiving position after a pallet has been transferred therefrom onto said transverse conveyor line.